United States Patent [19]
Friedenberg

[11] 3,915,639
[45] Oct. 28, 1975

[54] DRUG ABUSE DIPSTICK

[76] Inventor: Robert M. Friedenberg, 8792 Oxwell Lane, Laurel, Md. 20810

[22] Filed: Oct. 18, 1973

[21] Appl. No.: 407,414

[52] U.S. Cl............ 23/230 B; 23/253 TP; 252/408; 210/25
[51] Int. Cl.[2]................... G01N 21/06; G01N 33/16
[58] Field of Search............ 23/230 B, 253 TP, 259; 252/408

[56] References Cited
UNITED STATES PATENTS

| | | | |
|---|---|---|---|
| 3,449,080 | 6/1969 | Edwards | 23/253 TP |
| 3,468,636 | 9/1969 | MacLeod | 23/253 TP |
| 3,511,608 | 5/1970 | Anderson | 23/253 TP |
| 3,531,254 | 9/1970 | Okuda | 23/253 TP X |
| 3,536,448 | 10/1970 | Patel | 23/253 TP |
| 3,598,704 | 8/1971 | Dahlquist | 23/253 TP |

OTHER PUBLICATIONS
Vincent P. Dole et al., J. Am. Med. Ass'n, 198(4), 115–118 (Oct. 1966).
Chemical Abstracts, 55:22715c (1961).

*Primary Examiner*—Morris O. Wolk
*Assistant Examiner*—Sidney Marantz

[57] ABSTRACT

Drug abuse compounds comprising the substances commonly referred to as hard narcotic, amphetamine and barbiturate compounds in physiological fluid specimens are qualitatively and semi-quantitatively detected by the use of an ion exchange dipstick in combination with a stain-producing reagent, which will react with the various drug abuse compounds to form colored products, and a stain-intensifying reagent which will intensify the coloring effect of the stain-producing reagent.

20 Claims, 6 Drawing Figures

DRUG ABUSE DIPSTICK

FIELD OF THE INVENTION

This invention relates generally to a method and means for qualitatively and semi-quantitatively detecting the presence of nitrogenous narcotic compounds; and, specifically, barbiturates, amphetamines and alkaloids including hard narcotics in physiological fluids. More particularly, this invention relates to a dipstick which is useful for the qualitative or semi-quantitative analysis of body fluids such as blood, serum, urine or saliva for the presence of drug abuse compound residues; and a method of analysis of the content of such body fluids of such drug abuse compound residues by use of such dip stick.

DESCRIPTION OF PRIOR ART

Increased drug abuse has created new demands for rapid analytical procedures for that kind of drug detection. Currently the available analytical procedures are either insufficiently accurate or are unacceptably slow or involve testing with instruments at an exhorbitant cost to permit their use for surveillance of large groups.

According to the more commonly used analytical procedures, a urine specimen from a suspected drug abuser is adjusted and buffered for pH. The solution is then extracted or subjected to ion exchange extraction to concentrate the drug residue. The concentrated material is then chromatographed to separate constituents and then treated with one or more staining or color indicative reagents such as Dragendorff reagent which will react with certain tertiary nitrogen groups such as particular narcotic classes, to provide a generalized indication. Other useful staining reagents include ninhydrin for amphetamines and sodium sulphate for barbiturates. Such techniques are not satisfactory for indicating the presence of specific substances within the classes of narcotics, nor for indicating barbiturates and amphetamines for several reasons. First, the staining reaction tends to fade within minutes and disappears almost completely within 5 to 10 minutes. Second, the colors for different members of the same class are essentially the same and various constituents are very difficult to distinguish by color or migration rate (R value). Third, essentially the same color reactions and migration rates are obtained with either nicotine, a very common alkaloid found in tobacco; morphine, commonly identified from heroin, an addictive compound; or antibiotics such as tetracycline.

Another difficulty is that such conventional extraction methods will only succeed in giving a clear positive reading if the drug residue is present in the specimen in substantial quantities. Some narcotic compounds will only appear in the urine in large concentrations within hours of use. The relationships between physiological addiction (the narcotic being deposited in the tissues) and excretion rate is poorly understood. Moreover, even when the test specimen is taken within hours of use, conventional techniques often require a drug concentration in an order of magnitude of mg/ml. to obtain a positive reading. This is due to the fact that the classical staining procedure only identifies the drugs in their free form; and, since approximately one half the drug, or more, is in the conjugated form, higher concentrations for identification are necessary. Since the concentration of drug residues in the urine are usually in an order of magnitude of only micrograms/ml., repeated and time consuming extractions are often necessary when using such conventional techniques.

In many other clinical urinalysis procedures, dipstick testers are available whereby the urine specimen is applied to a stick containing suitable color reagents which are specific to the presence of selected compounds. Such rapid detecting sticks are available for a wide variety of specific compounds and for detecting a wide variety of abnormal conditions and diseases. Some conventional dip sticks have even contained ion exchange materials, whereby the test compounds within the urine specimen are simultaneously concentrated as the color reaction proceeds. Although such a dip stick technique would obviously be quite desirable for drug abuse compounds which must be detected, the large number of narcotic and other drug abuse products which must be detected; the relatively large concentrations of drug residues which are required for positive results; and the difficulty of distinguishing between objectionable and non-objectionable species within the same class of hard drugs; has completely hindered the development of such a dip stick procedure. For instance, U.S. Pat. Nos. 3,376,114, 3,464,798, 3,468,636, 3,509,872, and 3,531,254, all show dip sticks for analytical testing of physiological fluids which use an ion exchange material to concentrate the suspected compound. In each instance the concentration of ion exchange resin within the dip stick is low. Also, in each instance, the range of compounds being tested for is relatively narrow, with uniquely defined chemical properties. In the case of drug abuse testing, however, the required concentration necessary for a positive response, using conventional test materials, is quite high; and the range of compounds is large.

A need continues to exist, therefore, for a method of rapid drug residue determination and identification even in relatively low concentrations for direct identification in body fluids.

SUMMARY OF THE INVENTION

Accordingly, it is one object of this invention to provide a method and means such as a dipstick for rapid analytical determination for the presence of hard narcotic, barbiturate and amphetamine drug residues directly in physiological fluids. The term 'physiological fluids' as herein used refers to such body liquids as urine, saliva, blood serum, sweat and tears and, in some cases, to whole blood.

It is another object of this invention to provide a method and means for rapid qualitative and semi-quantitative identification of particular species of such drug residues.

It is another object of this invention to provide a method and means for rapid qualitative and semi-quantitative analysis directly in physiological fluids for the presence of such objectionable drug abuse residues, even when such residues are present in relatively low concentrations within the fluid.

In broadest aspect a carrier body is provided which is commonly referred to herein as a dipstick which may be of any suitable shape or form, typically as shown in the drawings as referred to below. This carrier body is impregnated or coated with several essential drug reactive components. First it carries an ion exchange resin serving to concentrate and/or extract the drug to be tested as reacted therewith by contact with the body fluid contacted therewith. A second essential component is a stain operative in contact with the absorbed drug from the body fluid to impart to the composition characteristic color useful to identify the particular drug or a drug group. A third component serves to magnify, intensify and stabilize the color of the stained composition, so that it assumes a characteristic strong and easily recognizable color which remains stable for a useful period of time. A hydrazine preferably 2,4-dinitrophenyl hydrazine, in contact with the stain and absorbed drug, gives an intense and relatively permanent color, manifold stronger and more stable than the color usually produced by drug stains already known in the art.

In practice a dip stick will be formed for a particular purpose, that is, to test for a particular suspected drug, and the stain producing reagent i.e. the Dragendorff stain, will be used with the dip stick for narcotics testing. Sodium sulfate is a usefully known stain for a barbiturate test. For testing of the presence of amphetamines, ninhydrin is a commonly used stain. The dipstick in each case carries a small quantity of the stain strengthening compound in combination with the ion exchange resin and group stain. The stain will be selected for its effectiveness for identifying the particular drug to be tested, as listed.

Alternately, a single carrier dip stick may be used to test many drugs and may have different areas of the dip stick each impregnated with a different stain whereby each in contact with the body fluid will impart a characteristic color to that particular area, significant of the drug being tested.

Finally, the dipstick may be a laminate in which one layer serves as a filter to separate substances from the body fluid such as proteins, whereby the filtrate, freed of protein, is better prepared to give the characteristic color test of the drug.

The invention is further taught with respect to the drawings wherein.

Figures 1, 2:
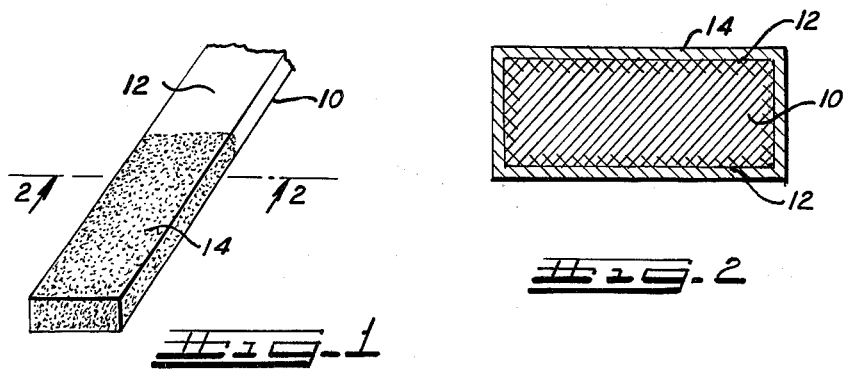
FIG. 1 shows a dip stick for a single drug to be tested.
FIG. 2 is a section taken on the line 2—2 of FIG. 1.

FIGS. 1 and 2 show a single purpose dip stick and it comprises a central strip of paper 10 having a coating on both surfaces 12 of a granular mixture of ion exchange resin 14, as identified below. The resin is mixed with a powdered stain material; for example, ninhydrin for amphetamines, sodium sulfate for barbiturates, and Dragendorff stain for a narcotic. A third component admixed with and evenly distributed with the stain is a stain stabilizer and intensifier; for example, a hydrazine. The stain converts the exchanger concentrated or absorbed drug to a color typical of the drug. Such absorbed color may be so dilute and the color tends to fade away, often rapidly, that its very appearance may be ephemeral or transitory. The intensifier and stabilizer such as the hydrazine, preferably an aryl hydrazine, intensifies and strengthens the color to reproduceable and recognizable color, typical of and indicative of the abuse drug of its group type. Moreover, the intensifier fixes the color so that it will be fixed and recognizable as such for a considerable period of time.

Where, as intended, the dip stick of FIG. 1 is to be used for a single purpose, for example to test for barbiturates, the composition coated on the carrier 10 will be the ion exchange resin mixed with sodium sulfate and a stabilizer for the color developed; for example, 2,4-dinitrophenyl hydrazine. Again, where the dip stick is to be used for an amphetamine, a ninhydrin will be substituted for the sodium sulfate. Where, as the staining substance, it is to be used to test for a narcotic, the stain will be the Dragendorff reagent. In each case the staining substance will be mixed with the color intensifier and stabilizer, such as the hydrazine.

Figures 3, 4:
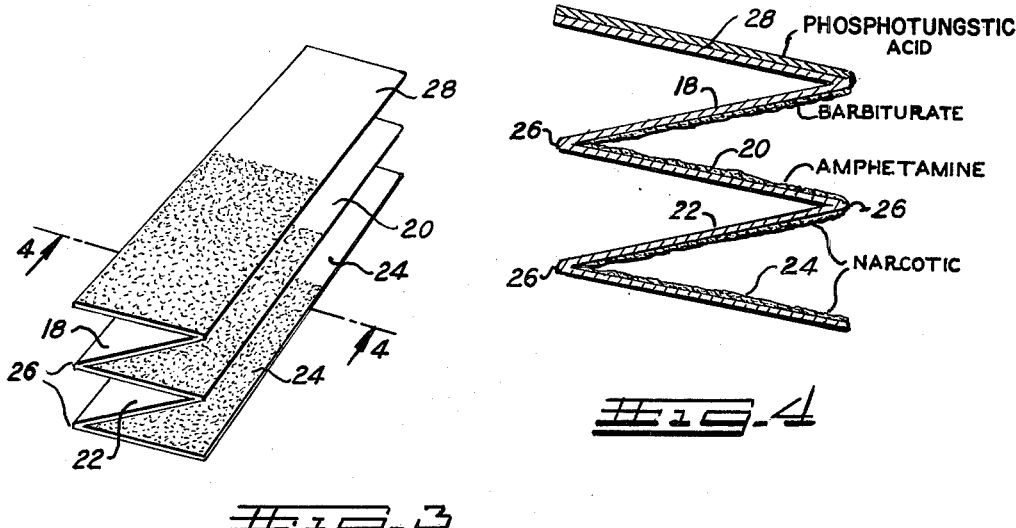
FIG. 3 illustrates a dip stick of several folded sheets, useful for testing for several drugs.
FIG. 4 is a section taken on the line 4—4 of FIG. 3.

Referring to FIGS. 3 and 4, a composite dip stick is shown, comprising several folded layers 18, 20, 22 and 24, or more layers as desired, folded at their joining points 26, so that they will be folded or unfolded, accordion-like, to lie flat as layers and be opened slightly, or unfolded, one layer separated from the next, as shown, for test purposes. Each layer 18, 20, 22 and 24 have a separate coating except possibly two of them may be duplicated. For instance, the layer 18 may be coated with a composition for testing of barbiturates, whereby it will be a mixture of ion exchange resin, sodium sulfate and a hydrazine. Again, the coating upon the layer 20 may be for testing of amphetamines, whereby it will consist of the ion exchange resin ninhydrin and a color stabilizer-intensifier hydrazine. Generally the layers 22 and 24 may have the same coating, for instance, the combination of Dragendorff reagent with phenyl hydrazine and ion exchange resin. It is possible, however, where more than one narcotic is expected, that test reagents sensitive each to a different narcotic will be coated respectively, a different one on each of the layers 22 and 24.

Again, referring to FIGS. 5 and 6, a dip stick 10 such as shown in FIG. 1, has a loose porous paper filter leaf 28 folded at an edge 30 to an edge of the dip stick 10 to cover the exposed surface dip stick 16 and act as a filter to remove interfering substances from the body fluid before it contacts the surface 16. In testing for body fluids which may contain protein, for instance, the leaf 28 is held folded down over the surface 16 and is wet with the fluid to be tested. The leaf 28 is impregnated with a precipitant of an unacceptable component such as, for example, protein in the body fluid. The leaf 28 may be coated with phosphotungstic acid which will precipitate the protein in the leaf 28 as the body fluid passes through for contact with the reagent 16 freed of protein, the proteins being precipitated in the porous sheet 28 and thereby the body test fluid freed of proteins will give a true test color in reaction with the surface 16 of the dip stick.

While Dragendorff's is a preferred staining solution for narcotics, others known for this purpose may be substituted. The following identifies a list of staining compositions and their characteristic colors. As indicated above, each narcotic may and usually does have a characteristic color tone or shade, its specific identity will be recognizable by one skilled in the art.

TABLE I

Chromogenic Reagents For Narcotic Analgesics

| Reagent and Preparation | Spot Color | Sensitivity and Specificity |
|---|---|---|
| Dragendorff's-Solution A: bismuth subnitrate (2.13 g), water (100 ml) and glacial acetic acid (25 ml). Solution B: Potassium iodide (50 g) and water (125 ml). Spray solution: (10 mlA), (10 mlB), acetic acid (20 ml), and water (100 ml). | Orange-brown on light yellow background | General reagent for alkaloids, stable for several weeks. Limit of detectability 3–10 ug compound. |
| Potassium iodoplatinate - 10% platinic chloride (1 ml) mixed with 4% potassium iodide (25 ml) and water (to 50 ml) | Blue-violet on pink background | Similar to Dragendorff's. Some selectivity in that color not observed with compounds containing only primary or secondary amino groups. Minimum level of detectability 0.1–1.0 ug compound. |
| Iodine in potassium iodide (Mandel's)-Stock solution: iodine (2 g), potassium iodide (4g), and water (94 ml). Spray solution: mix stock solution. (10 ml) with aqueous ethanol (90 ml). | Yellow-brown fading rapidly | Nonspecific. Sensitivity is less than Dragendorff's. Marceine becomes blue. |
| Bromocresol green (0.5 g) in ethanol (100 ml). | Green-blue on yellow-green background | Non-specific. Reaction with nearly all amines either immediately or within half an hour. |
| Potassium permanganate - 0.1–0.5% in water | Yellow on pink background | About 50% narcotics give positive reaction. Reagent highly unspecific and best used for differentiating pure alkaloids. |
| Cobalt thiocyanate - 2% wt/vol in acetone. | blue on pale pink background | Nearly all bases give positive reaction either immediately or after a few hours. Some compounds differentiated by green color and others by speed of color development. Limited value. |

Additional reagents known in the art are Marquis reagent which gives a purple spot color; ammoniacal silver nitrate, which provides a black color; potassium ferricyanide (Kiefer's reagent) which provides a blue color; Diazo-reagents, which give an orange-yellow spot color as well as red-purple shadings and pink colors (due to decomposition products); and Phosphomolybdic acid which provides a blue color for phenolic compounds and is specifically used for morphine detection; all of these reagents being known in the art.

Other color test stains are available in the art. See particularly pages 42 through 49 and 67 of NARCOTIC DRUGS, "Biochemical Pharmacology" edited by Doris H. Clouet, Plenum Press, New York, 1971, Library of Congress catalog card number 76–128503, the list being here incorporated by reference.

For amphetamine testing the reagent referred to herein by its commercial name Ninhydrin is, more exactly, triketohydrindene hydrate.

In general the color test effect produced by contact of the test reagent substances, ion exchange resin, staining agent and intensifier are largely a function of the very small quantity abuse drug contained in the very small quantity of body fluid, so that the proportions of the ion exchange resin with respect to the stain is not critical nor the quantity of the total composition with respect to the dip stick or carrier body. It is desired only that the dip stick provide a carrier body having an area coated or impregnated with the composition in finely divided form to exhibit the color visibly.

For this purpose the dip stick is preferably any body having a significant area carrying the color test composition which is made visible and visibly identifiable during the test. Thus, it can be porous paper or wood or other fiberous body; or it can be plastic or metal. The exposed area is impregnated with the composition, either as a mixture of powders, granules or powders and granules or all or some of them can be dispersed, dissolved or suspended in a volatile liquid in which the dip stick is first dipped and coated or impregnated upon all or only the selected surface area and the stick is then dried by evaporation of the liquid. For coating firmly the composition can be mixed with water-soluble gums so that upon drying of an aqueous carrier liquid the composition is firmly bonded to the said dip stick.

The color intensifier-stabilizer is desirably related to the staining agent and particularly for a hydrazine it is found that the quantity of aryl hydrazine will range from about 0.01 to 10% by weight of the staining agent.

DETAILED DESCRIPTION OF THE INVENTION

A physiological fluid specimen, such as urine, blood, serum or saliva is taken from the suspected drug abuser and any drug abuse residues therein are concentrated by contact onto and with an ion exchange member. The member may be in any form. However, a paper or fiber matrix having an ion exchange resin embedded therein or composed of an ion exchange substance in fiberous form, has proven to be quite suitable. Any ion exchange resin or groups of ion exchange resins which are conventionally used for concentrating narcotic drug residues may be used.

For instance, said common ion exchange resins include SA-2 ion exchange filter paper (Reeve Angel), Amberlite IR120, IRC50, IR-4B, IRA 411, Dowex 50X212, Dowex-a and Lewatit MN. Such resins are common, commercially available ion exchange resins which are characterized by being an insoluble solid resinous or plastic body having active polar groups such as carboxy or amino groups capable of chemically bonding anionic or cationic compounds thereto, and from which the concentrated anionic or cationic drug may be eluted by appropriate acid or base solution. Usually and particularly for narcotics the cationic resin such as Amberlite IR120 is used in the Na+ form.

Combinations of these ion exchange resins, and particularly combinations of at least one resin from each of the above groups, is desirable for concentration and subsequent simultaneous detection of a large number of different drug residues.

The specific proportions may vary with the type of physiological fluid being tested; the particular ion exchange resin or resins; and the particular stain and intensifying reagents used. A member containing 20% to 80% by weight of ion exchange resin based upon the quantity of the specimen will be used for a 10 ml. to 500 ml. of specimen, with optimal results at 100 ml. of specimen for urine or blood. Tests upon other body fluids in quantity ranging from 1 to 155 cc. will be contacted with the larger quantity of resin such as 50% to 80% by weight thereof.

The ion exchange member may be dipped and swirled in the specimen or the specimen may be poured over the member once or repeatedly, to concentrate the drug residues therein. At least 30 seconds to 2 minutes contact time must be provided for contact between the member and the solution, depending upon the particulars of the system, to enable sufficient concentration. The precise time will become readily apparent by the ordinary practitioner of this invention with minimum experience.

The temperature of contact of the ion exchange member with the specimen will have no bearing on the rate of absorption and hence, the contact time. The temperature, of course, should not be so high or low as to damage the specimen. Good results have been obtained at temperature of from 20°C to 50°C. Above 75°C or below 15°C the various stains are generally unsatisfactory.

The ion exchange member is then treated with a combination of a stain-producing reagent as listed above, and a stain intensifying reagent such as an aryl hydrazine. These reagents can be applied sequentially or simultaneously to the member, or may be carried within the member, such as being embedded or absorbed onto the paper or fiber matrix, so that the color indication is obtained simultaneously with the concentration of the drug residues on the member. When the reagents are carried on the member, they must be protected so that they are not dissolved and diluted by the remainder of the specimen which could reduce the intensity of the color formation.

As indicated, the ion exchange resin will be coated upon and absorbed into the dip stick such as paper or other absorbent in such quantity that some of the resin will be related to the quantity of test specimen, at least 20% thereof and usually more. For example, the dip stick coated substantially with resin stain and color intensifier-stabilizer, may be dipped into the test liquid in a test bottle, beaker, or test tube; or the test liquid may be applied upon the dip stick dropwise to wet it with the liquid to expose between about 10 and 500 cc's of specimen, typically about 50 to 250 cc's, to some 20% to 80% by weight thereof of ion exchange resin. The stain producing reagent can usefully be applied to the ion exchange coating upon the dip stick after the ion exchange resin has been contacted with the test solution; but usually and preferably the stain and stain intensifier-stabilizer will be mixed in small quantity such as from 1/10 to 10% of the ion exchange resin. That stain will contain a small quantity of stain intensifier such as a hydrazine in quantity of 0.1 to 10% by weight of the stain. The dip stick may be first coated with an ion exchange resin wet with an adhesive gum and dried. Both the stain intensifier and the stain may be mixed together and applied in an aqueous solvent to the specimen-wet dip stick; or each may be applied to the resin-coated dip stick in any sequence.

It is preferred to mix all three components together with an adhesive suspended or dissolved in an aqueous carrier; and the dip stick is then coated and/or impregnated with the mixture; and finally the dip stick is dried.

One good technique for applying the staining and intensifying reagents is to contain each of the reagents in aerosol containers. After dipping and swirling the ion exchange resin member into the specimen for a sufficient period of time to insure adequate concentration of any drug residues onto the member; the member is then removed from the specimen; sprayed with the stain producing reagent and then sprayed with the stain intensifying reagent.

Good results are obtainable when using Dragendorff reagent which is a standard iodoplatinate solution of platinic chloride, potassium iodide, bismuth subnitrate and acetic acid. Good results are further obtainable with 2,4-dinitrophenyl hydrazine as the stain or color intensifying agent.

The 2,4-dinitrophenyl hydrazine in combination with Dragendorff's reagent will not only intensify the stain, but will also cause the formation of different colors, depending upon the narcotic content of the sample. For instance, with methadone, a blue coloration will appear; for morphine a deep purple coloration will appear; for quinine a pink coloration will appear; and for nicotine a violet coloration will appear. When combinations of narcotic compounds are present, various shades of the above colors will be produced so that by use of a previously prepared color chart, the exact narcotic qualitative analysis can be obtained. In determining a specific narcotic the intensity of the color will yield a semi-quantitative measure of its concentration. When using this combination, good detection can be obtained even when the narcotic compound residue content is as low as 0.001 $\mu$g/ml. to 0.1 $\mu$g/ml. in the specimen.

The following specific examples are offered by way of further illustration of the practice of the present invention and are not intended to be taken as limiting except to the extent that is specifically expressed in any given example.

EXAMPLE I

An ion exchange filter paper Amberlite resin available commercially as Amberlite IR4B, a phenol formaldehyde polyamine type anion exchange resin, weakly basic as provided by said amine, is formed into a neutral aqueous suspension of 10 weight percent of said resin powder and 15 weight percent cellulose fiber suspended in water. The suspension is poured through a fine filter screen to leave a sheet-like filter cake, and dried thereon in warm air. Then, the fiber is cut into strips and coated with a 2% aqueous solution of a Dragendorff reagent stain as set forth in Table I above. The stain may be applied independently as two sprayed coatings of solution A and B in a sequence and both are then dried. The final coating is then applied by spraying with a 10% aqueous solution of 2,4-dinitrophenyl hydrazine to impart about a 2% hydrazine content based on the stain, and the coated strip is finally dried a third time. The dip stick is then used by dipping in 100 cc's of a test specimen of urine, for one minute, and is withdrawn. The test sample showed a deep purple stain, significant of the presence of about 4 to 6 ug of a heroin-type narcotic. The color was intense and stable and showed no significant fading after drying and exposure to air for three hours. In contrast, a control dip stick made up the same as in this Example, but omitting the 2,4-dinitrophenyl hydrazine gave an immediate stain on the same test sample of a blue which was highly transitory and which faded to a light blue and then, upon drying, substantially disappeared almost to about the original color of the paper, with only a slight greyish discoloration. The color, light purplish blue, initially appearing, did not last more than a couple of minutes before incipient fading began.

EXAMPLE II

Figures 5, 6:
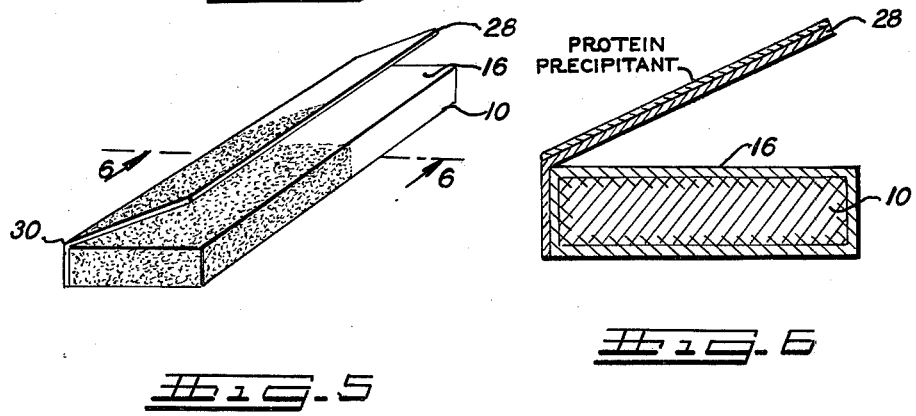
FIG. 5 shows a folded sheet useful to filter away proteins combined with the dip stick of FIG. 1.
FIG. 6 is a section through FIG. 5 taken on the line 6—6 of FIG. 5.

A dip stick was made up as in Example I except that a separate filter paper strip was first impregnated with a 15% aqueous phosphotungstic acid solution. The filter leaf was dried and then pasted with a narrow strip of gum arabic adhesive to an edge of the dip stick, impregnated as in Example I, to form an assembled pair of strips, as shown in FIGS. 5 and 6. A 100 cc. urine sample was supplied to the dip stick dropwise with the phosphotungstic acid strip folded down protectively as a filter sheet over the color test strip of the example; pouring the specimen upon the phosphotungstic acid-impregnated strip, precipitating protein even as it filters therethrough; passing then onto the narcotic test composition disposed on the surface of the second sheet. The second sheet by precipitation of protein first, before being wet with the filtered urine solution of test specimen, showed a purplish blue color in a significant shade, slightly different from that of Example I, that color remaining stable for a period of some five or six hours after drying of the dip stick.

EXAMPLE III

In a manner similar to that disclosed in Example I, the staining agent together with the ion exchange resin was applied, but substituting alternately on separate dip sticks ninhydrin and sodium sulfate as respective staining agents in substitution for the Dragendorff reagent thereof in Example I. In each case the dip sticks developed a strong and relatively permanent color when wet with a test specimen containing amphetamines, giving a characteristic light blue, and barbiturates, giving a pinkish white, respectively. Again, the color developed in each was relatively permanent, lasting in one instance for more than 4 hours, and in another instance for more than 3 hours, where ordinarily the stain in each instance, much weaker, begins to fade in color within a few minutes after becoming discolored by contact with the test specimen.

EXAMPLE IV

A filter paper sheet was made up by coating select areas with compositions of the same ion exchange resin ultimately coated with 2,4-dinitrophenyl hydrazine. In several different areas a differing staining agent is supplied with the mixture; respectively, Dragendorff reagent, sodium sulfate and ninhydrin. A fourth marginal area was coated with phosphotungstic acid, each coating being applied independently of the others in a manner to avoid intermixture. The several areas were then folded into a composite dip stick, as shown in FIG. 4, with the phosphotungstic acid being disposed uppermost. A 100 cc. urine sample containing, each in trace quantity an abuse drug, narcotic, amphetamine and barbiturate, is dropped first upon the phosphotungstic filter sheet to precipitate protein from the sample; and then by filtration through each of the several layers a characteristic color is developed for each of the said layers. The color remains permanent for several hours in each layer.

The omission of the hydrazine in each case reduced the intensity and stability of the color many times to a very weak color in contrast to that of the samples. When other hydrazines such as phenyl hydrazine, o-tolyl hydrazine or alphanaphthyl hydrazine were substituted, each developed a strong and stabilized color in the stain, indicative of a high color intensifying and stabilizing effect for other aryl hydrazines.

Certain modifications of the examples and disclosure may be used. The hydrazine in aqueous solution may be applied before or after contact with the test specimen, preferably as a light aqueous liquid spray upon the dip stick and the color developed will be quite strong and relatively permanent. It is also possible to coat other carrier bodies such as foamed resins to form the dip stick base. Again, various impurities contained in the test sample other than protein, as precipitated with phosphotungstic acid, may be removed by other precipitating procedures known in the art. The test sample may be merely filtered or it can be centrifuged to remove suspended impurities including various other components of the test sample; for instance, red blood corpuscles or the like can be removed before applying the drug abuse test to the purified blood test specimen.

Other modifications will occur to those skilled in the art and, accordingly, it is intended that the description hereinabove be regarded as illustrative and not limiting except as defined in the claims as appended hereto.

What is claimed is:

1. The method of indicating the presence of abuse-type drugs of the group consisting of narcotics, amphetamines, and barbiturates contained in a weak test solution of a living body specimen, comprising contacting the test solution with a solid mixture of an ion exchange resin, a staining agent operative to produce a distinct color significant of the presence of at least one of said abuse drugs absorbed and concentrated by the ion exchange resin from said test solution and a color intensifier and stabilizer substance to increase the developed color intensity of the drug absorbed by said resin in the presence of said staining agent for an extended time period of stability.

2. The method as defined in claim 1 wherein the stain is narcotic indicating.

3. The method as defined in claim 1 wherein the stain is amphetamine indicating.

4. The method as defined in claim 1 wherein the stain is barbiturate indicating.

5. The method as defined in claim 1 wherein the color intensifier-stabilizer is an aryl hydrazine.

6. The method as defined in claim 1 wherein the color intensifier-stabilizer is 2,4-dinitrophenyl hydrazine.

7. The method as defined in claim 1 wherein the color test composition is disposed upon a supporting surface of a dip stick and the color test reaction is effected by contact of said surface with the test solution.

8. The method as defined in claim 7 wherein the color test composition is distributed upon several distinct areas of said supporting surface, and at least two of the areas have a different stain to indicate independently in each area the presence of one of said abuse-type drugs.

9. The method as defined in claim 1 wherein both said color test composition and color intensifier in contact with said staining agent are disposed upon the supporting surface of a dip stick and the color test reaction is effected by contact of said surface with the test solution.

10. The method as defined in claim 9 wherein the test solution is urine.

11. The method as defined in claim 9 wherein the test solution is first filtered to remove interfering impurities and the filtered solution is then contacted with said supporting surface carrying said color test composition.

12. A test dip stick for test of body fluid specimens to indicate the presence of abuse-type drugs of the group consisting of narcotic, barbiturate and amphetamine, comprising a supporting surface having disposed thereon a test composition operative to contact with a body test liquid to develop an intense permanent color indicative of one of said drugs, said composition comprising a mixture of an ion exchange resin, a stain operative to develop a color with the abuse-type drug absorbed from a sample of said test liquid by said ion exchange resin and a color intensifier-stabilizer magnifying the developed color in intensity and stabilizing the same.

13. A test dip stick as defined in claim 12 wherein a support surface is a member of the group consisting of paper, wood, plastic and metal.

14. The test dip stick as defined in claim 12 wherein the intensifier-stabilizer is an aryl hydrazine.

15. The test dip stick as defined in claim 12 wherein the intensifier-stabilizer is 2,4-dinitrophenyl hydrazine.

16. The test dip stick as defined in claim 12 having a filter sheet mounted above the said supporting surface of said dip stick to intercept and precipitate interfering impurities from the said body test liquid before passing into contact with said supporting surface.

17. A test dip stick as defined in claim 12 comprising a supporting surface having disposed on separate areas thereof a test composition operative in contact with a body test fluid to develop an intense permanent color indicative of one of said drugs, said composition comprising a mixture of an ion exchange resin, a stain operative to develop a color with the abuse-type drug absorbed from a sample of said test fluid by said ion exchange resin and a color intensifier-stabilizer magnifying the developed color in intensity and stabilizing the same.

18. The test dip stick as defined in claim 17 having a filter sheet mounted above the said supporting surface of said dip stick to intercept and precipitate interfering impurities from the said body test fluid before passing into contact with each of the areas of said supporting surface.

19. The method of indicating the presence of abuse-type drugs of the group consisting of narcotics, amphetamines, and barbiturates contained in a weak test solution of a living body specimen, comprising contacting the test solution with a solid mixture of an ion exchange resin, a hydrazine-compound staining agent operative to produce a distinct color significant of the presence of at least one of said abuse drugs absorbed and concentrated by the ion exchange resin from said test solution and a color intensifier and stabilizer substance to increase the developed color intensity of the drug absorbed by the said resin in the presence of said staining agent for an extended time period of stability.

20. A test dipstick for test of body fluid specimens to indicate the presence of abuse-type drugs of the group consisting of narcotic, barbiturate and amphetamine, comprising a supporting surface having disposed thereon a test composition operative in contact with a body test liquid to develope an intense permanent color indicative of one of said drugs, said composition comprising a mixture of an ion exchange resin, a stain operative to develope a color with the abuse-type drug absorbed from a sample of said body test liquid by said ion exchange resin and a hydrazine compound as a color intensifier-stabilizer magnifying the developed color in intensity and stabilizing the same.

* * * * *